(12) United States Patent
Kilian et al.

(10) Patent No.: US 11,362,496 B2
(45) Date of Patent: Jun. 14, 2022

(54) SUPPORTING ELEMENT FOR A CABLE

(71) Applicant: TE Connectivity Germany GmbH, Bensheim (DE)

(72) Inventors: Mirko Kilian, Bensheim (DE); Michael Floesser, Bensheim (DE); Ronny Puchner, Bensheim (DE); Philipp Beese, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/075,074

(22) Filed: Oct. 20, 2020

(65) Prior Publication Data

US 2021/0184440 A1    Jun. 17, 2021

(30) Foreign Application Priority Data

Dec. 12, 2019    (EP) .................................... 19215516

(51) Int. Cl.
*H02G 3/04*    (2006.01)
(52) U.S. Cl.
CPC ................................ *H02G 3/0462* (2013.01)
(58) Field of Classification Search
CPC ........ H01R 13/52; H01R 13/506; H01R 4/18; H01R 11/22; H01R 4/185; H01R 4/187; H01R 13/5205; H02G 15/013; H02G 3/04; H02G 15/007; H02G 3/22; H02G 3/06
USPC ........................................................ 174/659
See application file for complete search history.

(56) References Cited

U.S. PATENT DOCUMENTS

| | | | | |
|---|---|---|---|---|
| 4,802,867 A | * | 2/1989 | Palmer ............... | H01R 13/4367 439/205 |
| 4,969,841 A | * | 11/1990 | Sueyoshi ............. | H01R 13/422 439/595 |
| 4,973,266 A | * | 11/1990 | Bullard .................. | H01R 13/52 439/589 |
| 5,519,170 A | * | 5/1996 | Nabeshima ........ | H01R 13/5205 174/74 R |
| 5,607,318 A | * | 3/1997 | Wakata .............. | H01R 13/5205 439/274 |
| 5,824,962 A | * | 10/1998 | Katsuma .............. | H01R 43/005 174/135 |
| 5,971,816 A | * | 10/1999 | Chaillot ............... | H01R 13/113 439/852 |

(Continued)

FOREIGN PATENT DOCUMENTS

DE    202018101152 U1    6/2019
JP    H01107886 U    7/1989

(Continued)

OTHER PUBLICATIONS

Extended European Search Report, European Application No. 19215516. 6-1201, European Filing Date, dated May 18, 2020.

*Primary Examiner* — Timothy J Thompson
*Assistant Examiner* — Michael F McAllister
(74) *Attorney, Agent, or Firm* — Barley Snyder

(57) ABSTRACT

A supporting element for positioning a cable in a hole includes a support part, a holder part joined together with the support part, and a cable opening extending through the support part and the holder part. The support part and the holder part are made from different materials. The cable opening receives the cable. The holder part has a retention element securing the supporting element within the hole.

20 Claims, 1 Drawing Sheet

(56) References Cited

U.S. PATENT DOCUMENTS

| | | | | |
|---|---|---|---|---|
| 7,211,731 B2* | 5/2007 | Nagamine | ............ | H01R 43/005 |
| | | | | 174/74 R |
| 9,065,188 B2* | 6/2015 | Liegl | ....................... | H01R 4/185 |
| 2010/0075523 A1* | 3/2010 | Saitou | ................ | H01R 13/5205 |
| | | | | 439/273 |

FOREIGN PATENT DOCUMENTS

| | | | |
|---|---|---|---|
| JP | H04101381 U | 9/1992 | |
| JP | H0638171 U | 5/1994 | |
| JP | 2011253714 | * 12/2011 | ............. H01R 13/52 |
| JP | 2011253714 A | 12/2011 | |

* cited by examiner

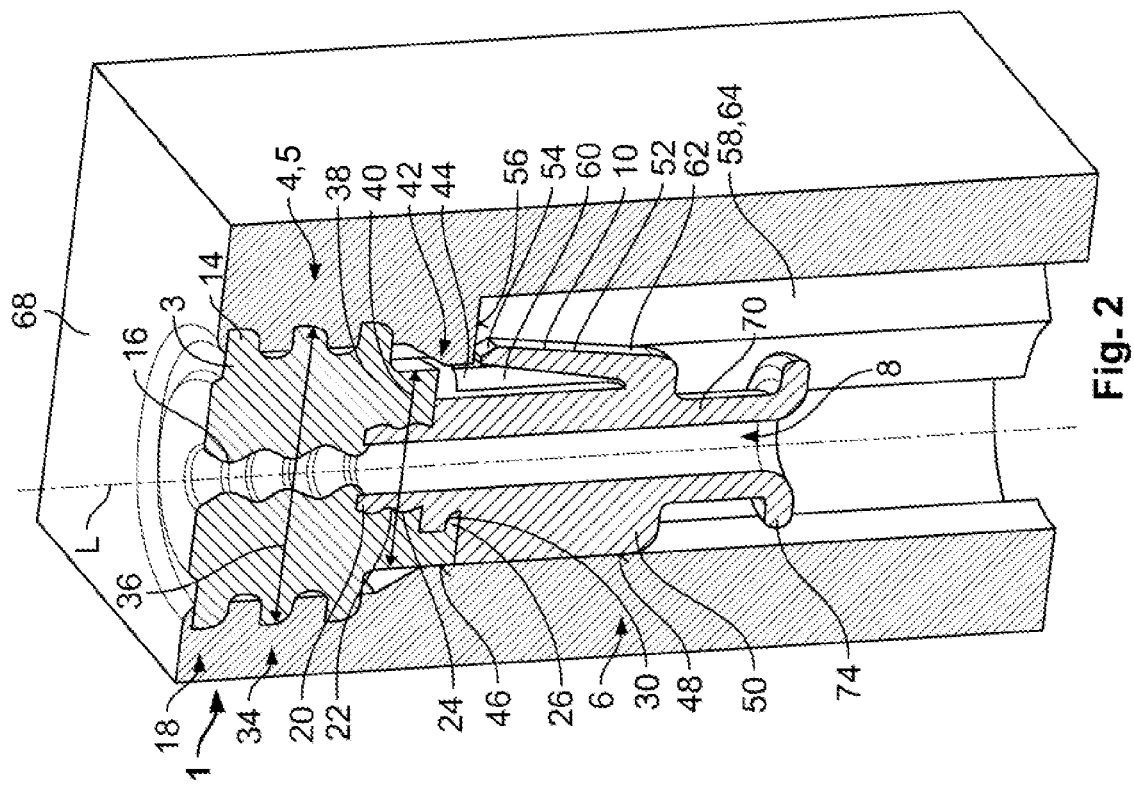
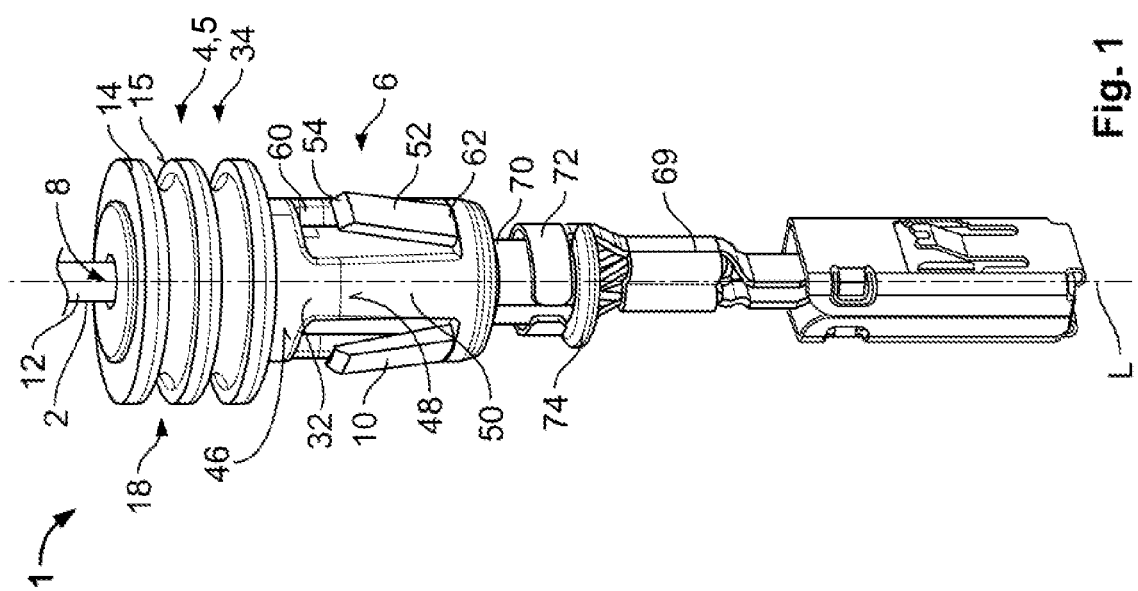

SUPPORTING ELEMENT FOR A CABLE

CROSS-REFERENCE TO RELATED APPLICATION

This application claims the benefit of the filing date under 35 U.S.C. § 119(a)-(d) of European Patent Application No. 19215516.6, filed on Dec. 12, 2019.

FIELD OF THE INVENTION

The present invention relates to a supporting element and, more particularly, to a supporting element for positioning a cable in a hole.

BACKGROUND

Supporting elements may be used to stabilize the position of an electrical cable, particularly a single wire cable, in a hole of a connector housing. The supporting element is adapted to at least fixate the relative radial position of the cable within the hole. Usually, the supporting element is sleeved around the sheath of the cable and crimped to the cable. However, in existing applications, movement, particularly axial and/or rotational movement, of the cable is transferred directly to the crimped area leading to a movement of the terminal. This may cause extensive wear on the terminal itself and to a mating tab connected to the terminal.

SUMMARY

A supporting element for positioning a cable in a hole includes a support part, a holder part joined together with the support part, and a cable opening extending through the support part and the holder part. The support part and the holder part are made from different materials. The cable opening receives the cable. The holder part has a retention element securing the supporting element within the hole.

BRIEF DESCRIPTION OF THE DRAWINGS

The invention will now be described by way of example with reference to the accompanying Figures, of which:

FIG. 1 is a perspective view of a supporting element according to an embodiment; and FIG. 2 is a sectional perspective view of the supporting element mounted in a hole.

DETAILED DESCRIPTION OF THE EMBODIMENT(S)

In the following, the supporting element according to the invention is explained in greater detail with reference to the accompanying drawings, in which exemplary embodiments are shown. In the figures, the same reference numerals are used for elements which correspond to one another in terms of their function and/or structure.

According to the description of the various aspects and embodiments, elements shown in the drawings can be omitted if the technical effects of those elements are not needed for a particular application, and vice versa: i.e. elements that are not shown or described with reference to the figures but are otherwise described herein can be added if the technical effect of those particular elements is advantageous in a specific application.

A supporting element 1 according to an embodiment is shown in FIGS. 1 and 2. FIG. 1 shows a schematic perspective view of the supporting element 1 and FIG. 2 shows a schematic cut view of the supporting element 1 mounted in a hole 3.

The supporting element 1 is adapted to position a cable 2 in a hole 3, as shown in FIGS. 1 and 2. The supporting element 1 includes a support part 4 and a holder part 6, which are joined together and made from different materials, particularly different resin materials. The supporting element 1 further comprises a cable opening 8 extending through the support part 4 and the holder part 6, whereby the cable opening 8 is adapted to receive the cable 2. In order to secure the supporting element 1 in the hole 3, the holder part 6 further comprises at least one retention element 10.

The cable 2 may be arranged coaxially in the hole 3 so that a distance to the wall of the hole 3 is substantially equal in any radial direction, preventing an imbalance during the insertion of the supporting element 1 with the cable 2 into the hole 3.

The cable 2, as shown in the embodiment of FIG. 1, may be a single wire cable 12, which is inserted through the cable opening 8. In an embodiment, at least one of the support part 4 and the holder part 6 may be substantially cylindrical and the cable opening 8 may be arranged coaxially in the supporting element 1.

The support part 4 may be a seal part 5, as shown in FIGS. 1 and 2, optimized for sealing the cable 2 received in the cable opening 8 and the hole 3 against moisture and other external particles. Therefore, the support part 4 may comprise an elastic material, particularly a silicone material, such as a silicone composite, which has good sealing characteristics.

The holder part 6, however, may be optimized for securing the supporting element 1 to the hole 3 and/or for fixedly attaching the supporting element 1 to the cable 2, e.g. via crimping. The holder part 6 may be optimized for securing the relative position of the supporting element 1 within the hole 3, particularly in the axial and/or circumferential direction. Therefore, the holder part 6 may comprise a material that has at least one of a higher stiffness and a higher hardness than the material of the support part 4. The holder part 6 may, in an embodiment, comprise a thermoplastic material which may be relatively rigid compared to the support part 4. The higher stiffness may prevent the holder part 6 from deforming due to the force applied to the holder part 6 upon movement of the cable 2. The holder part 6 may be rather rigid compared to the support part 4 for transferring the force applied to the holder part 6 due to movement of the cable 2 relative to the hole 3, e.g. pulling the cable 2 along a longitudinal axis L or rotating the cable 2 around the longitudinal axis L. The stiffness of the holder part 6 and the support part 4 may be compared by the Young's modulus, whereby the Young's modulus of the holder part 6 may be higher than the Young's modulus of the support part 4. In another embodiment, the holder part 6 can comprise a metal material.

The support part 4 may comprise circumferentially extending ribs 14 on an outer peripheral surface 15, as shown in FIGS. 1 and 2, which may be pressed against the wall of the hole 3 to further improve the supporting reliability of the supporting element 1 supporting the hole 3. To further increase the supporting reliability of the supporting element 1 supporting the cable 2, a wall of the cable opening 8 may comprise circumferentially extending ribs 16. Each rib 16 may press against the inserted cable 2, increasing the retention force acting on the cable 2. Each rib 16 may act as a seal on its own, so that if by any chance moisture or dust manages to pass one rib 16, the following rib 16 may block the further progress of the moisture or dust along the supporting element 1.

The circumferentially extending ribs 16 on the wall of the cable opening 8 may be limited to the support part 4. However, the wall of the cable opening 8 at the holder part 6 may also feature circumferentially extending ribs, which further stabilize the cable 2 in the supporting element 1.

The support part 4 and the holder part 6 may be joined to one another along a longitudinal axis L shown in FIGS. 1 and 2. In an embodiment, the support part 4 and the holder part 6 may be joined integrally with one another as a monolithic unit 18. The supporting element 1 may, for example, be a multi-component molded part. The holder part 6 may be formed in a first injection molding step and in a second injection molding step the support part 4 may be formed onto the holder part 6. During the addition of the support part 4, the material of the support part 4 and the holder part 6 may form chemical interlinks leading to a strong bond between the support part 4 and the holder part 6. The support part 4 and the holder part 6 may be adhesively bonded to one another, increasing the rigidity of a joint between the holder part 6 and the support part 4. The bond may be a chemical bond that may be established during the multi-component molding process.

Alternatively or additionally, the support part 4 and the holder part 6 may be engaged to one another in a positive fit blocking a detachment between the holder part 6 and the support part 4 in a direction parallel to the longitudinal axis L. The holder part 6 may comprise a substantially cylindrical axial protrusion 20, shown in FIG. 2, which may be received in the support part 4. The support part 4 may be formed onto the axial protrusion 20 by molding the support part 4 over the axial protrusion 20 in a multicomponent molding process.

The axial protrusion 20 may comprise an undulating shape substantially parallel to the longitudinal axis L creating radial indentations 22 and projections 24, as shown in FIG. 2. The radial indentations 22 may receive parts of the support part 4 and the projections 24 may project into the support part 4 creating an overlap between the projections 24 and the parts of the support part 4 received in the indentations 22, the overlap hindering a detachment of the support part 4 and the holder part 6. The undulating shape is not limited to a so-called "sine"-waveform. Any other waveforms such as square, triangle and sawtooth waveforms can be implemented.

As shown in FIG. 2, the support part 4 may further comprise at least one radial protrusion 26 extending into the holder part 6 so as to be received in an undercut 30 formed in the holder part 6. This may further improve the joint between the support part 4 and holder part 6. In another embodiment, the holder part 6 may have the radial protrusion 26 extending into the support part 4.

As shown in FIG. 1, the support part 4 may comprise three arms 32 arranged at 120° to one another, the arms 32 extending further in a direction essentially parallel to the longitudinal axis L than the remainder of the support part 4. Each arm 32 may be provided with the radial protrusion 26.

The support part 4 may comprise a sealing section 34 with a first diameter 36 defined by the circumferentially extending ribs 14, as shown in FIG. 2. The first diameter 36 may be larger than a diameter of a reception pocket 38 formed in the hole 3 for receiving the support part 4, thereby acting as a bung sealing the hole 3. With each rib 14, the holding force of the supporting element 1 within the hole 3 may be increased and each rib 14 may act as an additional seal against the entry of moisture or dust further into the hole 3. In an embodiment, the extending ribs 14 may be formed integrally with the support part 4.

In an intermediate section 42 following the sealing section 34, the support part 4 may have a second diameter 40, the second diameter 40 being smaller than the first diameter 36. In the intermediate section 42, the support part 4 and the holder part 6 may be joined together, meaning that in a cross section substantially perpendicular to the longitudinal axis L through the intermediate section 42, both the holder part 6 and the support part 4 may be present. The support part 4 may receive the axial protrusion 20 in the intermediate section 42.

The second diameter 40 of the support part 4 may be dimensioned so that the intermediate section 42 may be arranged in a constriction 44 formed in the hole 3 following the reception pocket 38, as shown in FIG. 2. Therefore, the constriction 44 may prevent a too deep insertion of the supporting element 1 into the hole 3, ensuring that the support part 4 seals an entrance of the hole 3. The hole 3 may taper at the end of the reception pocket 38 to form the constriction 44. The supporting element 1 can slide along the tapering surface adjusting the position of the supporting element 1 within the hole 3.

At the intermediate section 42, as shown in FIG. 2, the support part 4 may have an outer surface 46 which is at least at the arms 32 substantially flush with the adjoining outer surface 48 of a main body 50 of the holder part 6 preventing sharp edges which may damage the wall of the hole 3.

As shown in the embodiment of FIGS. 1 and 2, the holder part 6 has a substantially cylindrical main body 50. Along a circumference of the main body 50 at a 120° interval, retention elements 10 in the form of elastically deflectable latches 52 are provided. In the shown embodiment, three elastically deflectable latches 52 are provided, each latch 52 being distanced from the other latches 52 in a circumferential direction. The latch 52 may be formed integrally with the main body 50 as a monolithic component. The latch 52 may be attached to the main body 50 on one end and extend obliquely towards the support part 4, so that at least a tip 54 of the latch 52 may protrude from an outer circumference of the main body 50. The tip 54 may abut a wall 56 of a complementary formed retention element 58 in the hole 3. In another embodiments, two elastically deflectable latches 52 are provided and arranged diametrically to each other.

The main body 50, as shown in FIGS. 1 and 2, has a notch 60 formed on the outer surface 48 for each retention element 10, i.e. the elastically deflectable latches 52. Consequently, three notches 60 may be formed, whereby their center axes substantially parallel to the longitudinal axis L may be arranged 120° to one another. The retention element 10 may be aligned with the respective notch 60 so that the notch 60 provides space for the retention element 10 to be deflected radially inwards. The notch 60 may comprise a substantially rectangular shape wherein the latch 52 is connected to a base 62 distal to the support part 4 of the notch 60. The arms 32 may at least partially form a frame of the notch 60 bordering the notch 60 in the circumferential direction. Furthermore, a front end of the notch 60 may be bordered by the support part 4.

The holder part 6 may have an essentially circumferential cross section in a plane essentially perpendicular to the longitudinal axis L, whereby the notches 60 define sections with a first radius, which are connected by sections with a second radius, the second radius being larger than the first radius. In an embodiment, the arc length of each notch 60 may be essentially equal and the arc of each connecting section may be essentially the same length forming a rotationally symmetrical main body 50. In this case, at least the holder part 6 is rotationally symmetric every 120°, allowing the user to insert the supporting element 1 into the hole 3 in three different rotational positions.

The elastically deflectable latch 52 may slide along the tapered surface forming the constriction 44 in the hole 3 and be radially deflected inwardly into the notch 60 so that the holder part 6 may pass the constriction 44. Thereafter, the complementary retention element 58 of the hole 3 may be provided by, for example, radial recesses 64 allowing the latch 52 to pivot back towards its initial position so that the tip 54 may abut the wall 56, preventing movement of the supporting element 1 in the axial direction essentially parallel to the longitudinal axis L from the holder part 6 towards the support part 4. The recesses 64 may be separated from one another so that the retention elements 10 abut a border of the respective recesses 64, blocking a rotational movement of the supporting element 1 within the hole 3.

The support part 4, in an embodiment, is a material with good elastic properties, such as silicone, so that by the holder part 6 passing the constriction 44, the support part 4 is at least partly stretched along the longitudinal axis L. Once the insertion force is removed, the stretched part of the support part 4 recoils, pulling the holder part 6 along the longitudinal axis L towards the support part 4. Therefore, the holder part 6 is prestressed towards the support part 4, eliminating a possible play between the at least one retention element 10 and the complementary retention element 58 in the axial direction. Consequently, the supporting element 1 may reliably transfer any pulling motion of the cable 2 out of the hole 3.

The hole 3 may be, for example, a hole 3 in a connector housing 68, as shown in FIG. 2. Due to the fixation of the supporting element 1 in the hole 3, movement of the cable 2 protruding out of the hole 3, particularly pulling and/or rotational movement, will be directly transferred via the retention elements 10 to the housing 68 and not to a terminal 69 that may be crimped onto the cable 2 and the supporting element 1, particularly the holder part 6.

As can be seen in FIG. 1, the terminal 69 may be crimped to the holder part 6. For this, the holder part 6 has a neck section 70 formed at a distal end 72 distant to the support part 4, the neck section 70 having an essentially cylindrical form with a smaller diameter than the main body 50 of the holder part 6. The retention element 10 may be formed on the main body 50 and be arranged between the neck section 70 and the support part 4 at the neck section 70.

A metallic wire crimping section 72 may be attached, particularly crimped, to the neck section 70, as shown in FIG. 1. Therefore, at the neck section 70, the supporting element 1 can be fixedly attached, particularly crimped, to the cable 2. The metallic wire crimping section 72 may be formed by crimping wings of the terminal 69, thereby simultaneously crimping the terminal 69 to the neck section 70 and the supporting element 1 to the cable 2. However, the metallic crimping section 72 and the terminal 69 may be separate parts. To prevent the metallic wire crimping section 72 from slipping off of the neck section 70, the neck section 70 may end in a radially protruding collar 74.

In the shown embodiment, the supporting element 1, particularly the support part 4, has a sealing function sealing the connection between the cable 2 and the supporting element 1 and the connection between the cable 2 and the housing 68. However, within the scope of this invention, the support part 4 does not need to be a seal. The support part 4 may comprise notches or openings penetrating the support part 4 in the axial direction.

The supporting element 1 is fixed within the hole 3 via the at least one retention element 10 in at least one of the rotational position and axial position. The movement of the cable 2 is thus transferred by the supporting element 1, particularly by the at least one retention element 10, to the hole 3. Consequently, the crimping region may be stabilized, preventing movement of the terminal 69 due to cable 2 movement. Hence, the wear of the terminal 69 and a mating tab mating with the terminal 69 may be reduced, increasing the life expectancy of a contact assembly even when subjected to stress such as vibrations.

What is claimed is:

1. A supporting element for positioning a cable in a hole, comprising:
   a support part;
   a holder part joined together with the support part, the support part and the holder part are made from different materials; and
   a cable opening extending through the support part and the holder part, the cable opening receiving the cable, the support part and the holder part abutting the cable in the cable opening, the holder part has a retention element securing the supporting element within the hole.

2. The supporting element of claim 1, wherein a material of the holder part has a higher stiffness and a higher hardness than a material of the support part.

3. The supporting element of claim 1, wherein the holder part and the support part are joined integrally with one another to form a monolithic unit.

4. The supporting element of claim 1, wherein the supporting element is a multi-component molded part.

5. The supporting element of claim 1, wherein the support part and the holder part are engaged to one another in a positive fit.

6. The supporting element of claim 1, wherein the holder part has a protrusion received in the support part.

7. The supporting element of claim 1, wherein at least one of the holder part and the support part has a radial protrusion extending into the other of the holder part and the support Part.

8. The supporting element of claim 1, wherein the retention element is one of a recess and a protruding elastically deflectable latch.

9. The supporting element of claim 1, wherein the holder part has a pair of retention elements distant from one another along a circumference of the supporting element.

10. The supporting element of claim 1, wherein the holder part has a neck section at a distal end distant to the support part.

11. The supporting element of claim 10, wherein the neck section has a smaller diameter than a main body of the holder part.

12. The supporting element of claim 11, wherein the retention element is arranged between the neck section and the support part.

13. The supporting element of claim 1, further comprising a metallic wire crimping section attached to the holder part.

14. The supporting element of claim 1, further comprising a plurality of circumferentially extending ribs at at least one of an outer peripheral surface of the support part and a wall of the cable opening.

15. A connector housing for receiving a cable, comprising:
  a hole; and
  a supporting element received in the hole, the supporting element including a support part, a holder part joined together with the support part, and a cable opening extending through the support part and the holder part, the support part and the holder part are made from different materials, the holder part is prestressed towards the support part, the cable opening receiving the cable, the holder part has a retention element securing the supporting element within the hole, the retention element engages a complementary retention element of the hole in a positive fit in at least one direction.

16. A supporting element for positioning a cable in a hole, comprising:
  a support part;
  a holder part joined together with the support part, the support part and the holder part are made from different materials, at least one of the holder part and the support part has a protrusion extending into or received in the other of the holder part and the support part; and
  a cable opening extending through the support part and the holder part, the cable opening receiving the cable, the holder part has a retention element securing the supporting element within the hole.

17. A supporting element for positioning a cable in a hole, comprising:
  a support part;
  a holder part joined together with the support part, the support part and the holder part are made from different materials; and
  a cable opening extending through the support part and the holder part, the cable opening receiving the cable, the holder part has a retention element securing the supporting element within the hole, the retention element is one of a recess and a protruding elastically deflectable latch.

18. A supporting element for positioning a cable in a hole, comprising:
  a support part;
  a holder part joined together with the support part, the support part and the holder part are made from different materials, the holder part has a neck section at a distal end distant to the support part; and
  a cable opening extending through the support part and the holder part, the cable opening receiving the cable, the holder part has a retention element securing the supporting element within the hole.

19. The supporting element of claim 18, wherein the neck section has a smaller diameter than a main body of the holder part.

20. The supporting element of claim 19, wherein the retention element is arranged between the neck section and the support part.

* * * * *